July 21, 1953 R. A. PYLE 2,645,902
ROTARY PUMP AND MOTOR FLUID TRANSMISSION
Filed Aug. 17, 1949 4 Sheets-Sheet 1
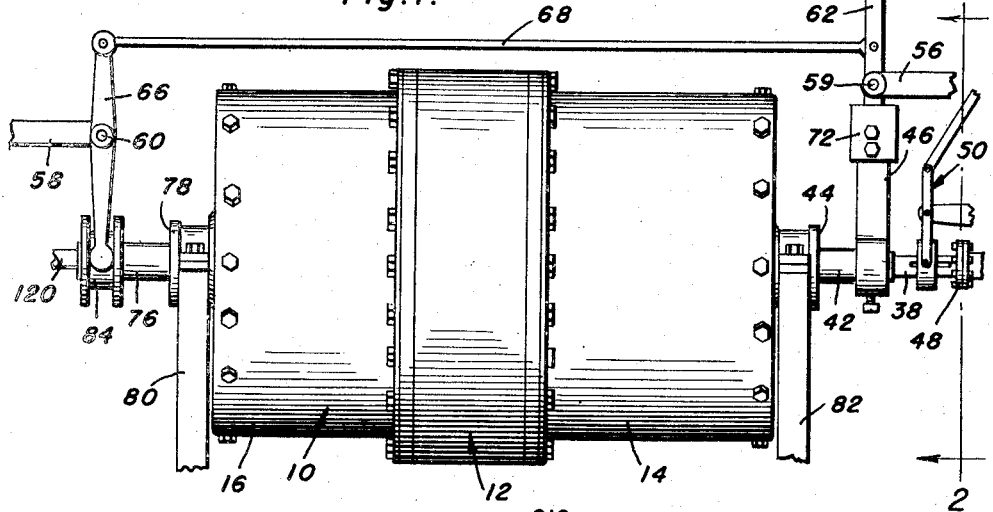
Inventor
Robert A. Pyle Inventor
Robert A. Pyle
By *Clarence A. O'Brien
and Harvey B. Jacobson*
Attorneys July 21, 1953  R. A. PYLE  2,645,902
ROTARY PUMP AND MOTOR FLUID TRANSMISSION
Filed Aug. 17, 1949  4 Sheets-Sheet 3

Inventor
Robert A. Pyle
By
Attorneys

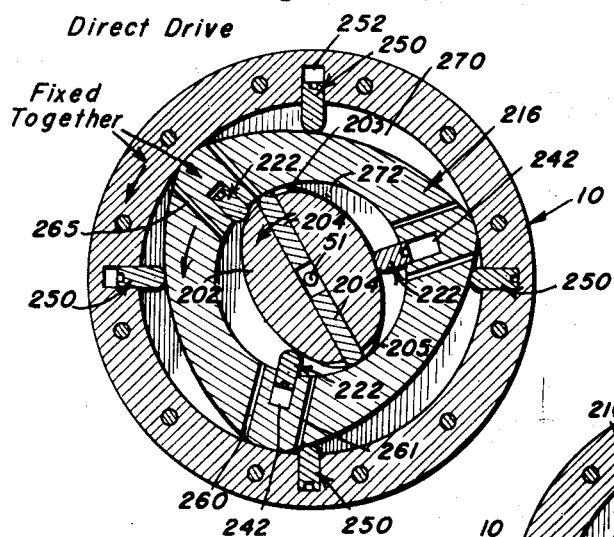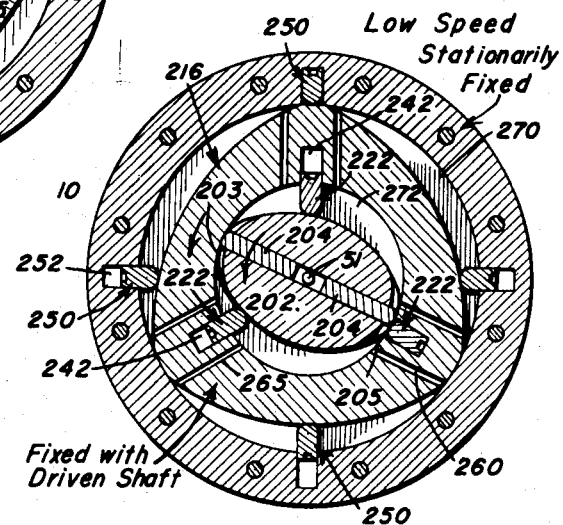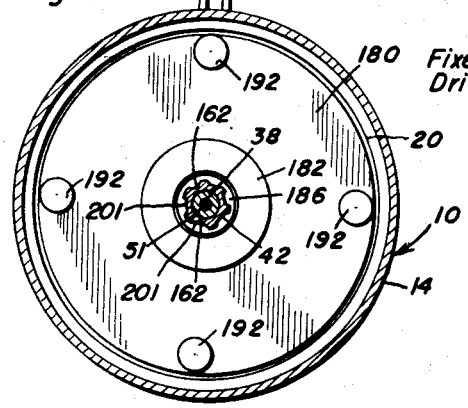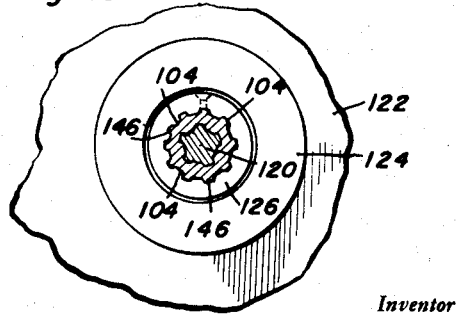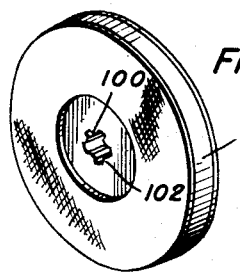
Inventor
Robert A. Pyle

Patented July 21, 1953

2,645,902

UNITED STATES PATENT OFFICE 2,645,902

ROTARY PUMP AND MOTOR FLUID TRANSMISSION

Robert A. Pyle, Lapeer, Mich.; Betty Pyle, executrix of said Robert A. Pyle, deceased Application August 17, 1949, Serial No. 110,863

13 Claims. (Cl. 60—53)

This invention relates to fluid transmissions and is a continuation-in-part of my copending application, Serial No. 83,013, which was filed on March 23, 1949, but is now abandoned, and relates to subject matter similar to my Patent No. 2,451,118.

The broad object of the invention is to produce a great number of speed and torque ratios between a driven shaft and a drive shaft and, in so doing, produce a smooth transmission of torque between the varying speeds, tending to obviate shock or vibration even in rapid change from one speed to the other.

Another object of this invention is to obviate the necessity of employing conventional gear assemblies in arriving at the various speeds both in the forward and the reverse direction of rotation of the driven shaft with respect to the drive shaft.

Ancillary objects and features of novelty will become apparent in following the description of the preferred form of the invention, illustrated in the accompanying drawings, wherein:

Figure 1 is an elevational view of the unit together with the control devices therefor;

Figure 2 is a sectional view taken substantially on the line 2—2 of Figure 1 and in the direction of the arrows;

Figure 5 is a sectional view taken on line 5—5 of Figure 3 and in the direction of the arrows, schematically illustrating the condition existing with respect to fluid flow when a direct drive from the drive shaft to the driven shaft exists;

Figure 6 is a sectional view somewhat similar to that shown in Figure 5 but illustrative of the condition existing when high torque and low speed of the output or driven shaft occurs;

Figure 9 is a sectional view taken substantially on the line 9—9 of Figure 3 and in the direction of the arrows, showing particularly a view of one of the holding assemblies;

Figure 10 is a sectional view taken on the line 10—10 of Figure 3, showing particularly the shafting involved in the power output end of the device;

Figure 11 is a perspective view of one of the holding assemblies, four of such assemblies being provided;

Figure 12 is a perspective view of one of the sliding vanes operatively connected between the outer case and the inner case, the said inner case constituting a part of the pump;

Figure 13 is a perspective view of the pump rotor; and

Figure 14 is a sectional view taken substantially on line 14—14 of Figure 4, showing the oil passage channel cut by the section.

Figure 3:
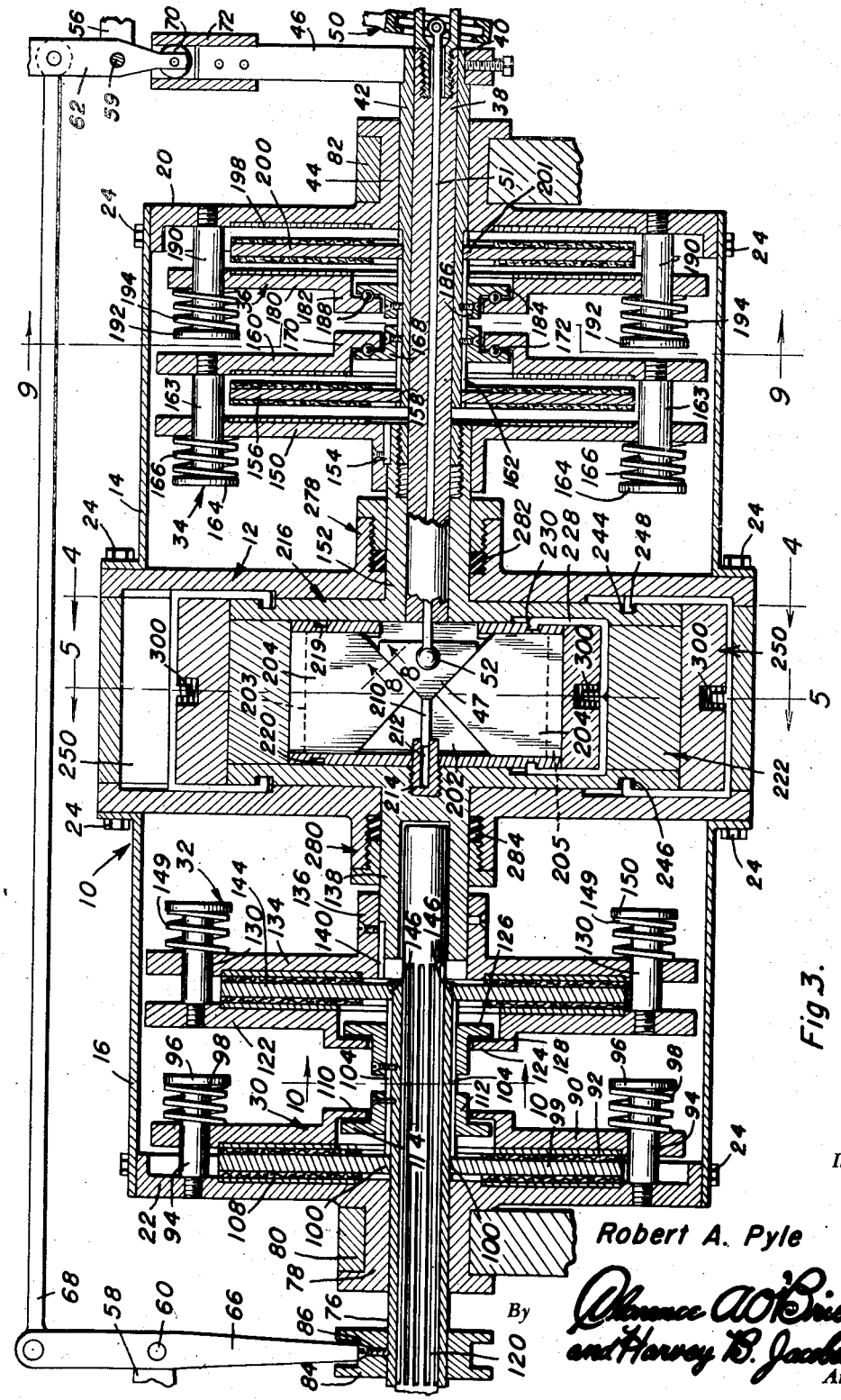
Figure 3 is a longitudinal sectional view of the unit disclosed in Figure 1, showing the various elements of the invention as they would be positioned when the driven shaft is operating at a low torque, high speed with respect to the drive shaft and, in effect, a direct drive condition existing.

In the present invention, I prefer to employ a pump having a control system for regulating speed and torque as disclosed in Patent 2,451,118. I also employ a control arrangement very similar to my copending application Serial No. 83,013, together with similar vanes in the pump and use the casing disclosed in my copending application in a somewhat different capacity, modifying it structurally a slight amount and attributing numerous additional functions to the casing of the copending application. In the present device, what was formerly the outer casing of the pump now becomes an inner casing having additional vanes operatively connected therewith and serving as an operative motor.

The illustrated form of the invention has been designed specifically for use in connection with internal combustion engines of the type normally found in automobiles and trucks. This type of engine has the characteristic of low torque at low speeds, and accordingly, for practical operation, requires either a fluid, mechanical or electrical transmission. The present invention deals with a combination mechanical and fluid transmission adapted for this particular use.

In the majority of instances, the fluid type transmission has separate gearing used in connection therewith in order to serve several functions, one of which is to provide a reverse operation of the driven shaft with respect to the drive shaft so that the vehicle may be capable of moving in a backward direction under its motive power. Reduction gearing is also used in the expected manner.

In my invention, I employ no gears in the true sense of the word. There are splined shafts involved which might be considered "gears." However, there are no gears of the type that are employed for causing a reverse operation of the various parts and for obtaining varying speed ratios. Rather, there are employed four holding assemblies in connection with a positive displacement pump of the variable ratio output type.

For practical operation, a direct drive will be used in a majority of operations, the reverse drive being used rather infrequently and the low speed, high torque condition will be employed in initial acceleration of the vehicle. However, vehicle engine speed is usually not high during the vehicle acceleration period. It operates from about 275 R. P. M. to a complete acceleration speed of 1600 to 1800 R. P. M., at which time the vehicle has acquired a speed from twenty to thirty M. P. H. and is in direct drive. Only then in this range is the torque multiplier used.

There is an outer case, generally indicated at 10, which consists of a housing 12 and aligned extensions 14 and 16 disposed on each side of the housing 12. The aligned extensions are shown as being cylindrical with end plates 20 and 22 fixed thereto as by screws 24. Similar screws are employed to hold the extensions fixed to the housing 12. In order to have access to the interior of the extensions 14 and 16, hand holes may be provided with suitable cover plates thereover.

The function of the outer case 10 is twofold. The first is to mount and support various components of the device and the second is to act as a torque transmission device, the specific details thereof being described subsequently.

There are four holding assemblies involved and used. The two assemblies generally indicated at 30 and 32 are disposed within the extension 16, while the two assemblies 34 and 36, respectively, are disposed within the extension 14. Each assembly is substantially identical in structure. However, the various assemblies serve different functions.

The shaft 38 (Figure 3) is adapted to drivingly operate the rotor of the pump and is considered the drive shaft. A non-circular end portion 40 (preferably square or rectangular) is provided on a sleeve 42. This sleeve is disposed in the bearing 44 formed at the center of the end plate 20, and the bore thereof forms a bearing for the drive shaft 38. A shifting rod 46 having a non-circular end portion disposed on the said portion 40 is fixed to the sleeve 42, preventing rotation thereof and is used for the purpose of axially sliding the sleeve 42 on the drive shaft 38.

The drive pump rotor 202 is fixed to the drive shaft 38 and is identical to that coupling seen in my copending application. The linkage, generally indicated at 50, is identical to the corresponding linkage, both in structure and function, to that employed in my copending application. The purpose of the linkage 50 is to axially operate the rod 51 having the head 52 at the inner end thereof.

Anchored members 56 and 58 respectively are shown largely schematically in Figure 3 and they support pivot pins 59 and 60, respectively, which pass through the operating lever 62 and the shifting fork or yoke 66, respectively. A pitman 68 connects the yoke 66 with the operating lever or handle 62 so that these elements must move in unison about the pivot pins 59 and 60 respectively as an axis. The lower end of the operating lever 62 is provided with a roller 70 which is disposed in the sleeve 72 and the sleeve is, in turn, fixed rigid with the lever 46. This construction allows the necessary sliding movement of the lower end of the shifting lever 62 with respect to the lever 46 which is fixed by means described previously to the sleeve 42. A clutch operating sleeve 76 is disposed in the bearing 78. This bearing is secured to or fixed with the end plate 22, projecting therefrom and having an external bearing surface accommodating the support 80. A similar support 82 is provided on the bearing 44 and, specifically, on an external bearing surface thereof. This mounts the entire outer case 10 for rotation.

The clutch operating sleeve 76 has a collar 84 fixed thereto by any suitable means such as the screw 86 so that the collar moves rotatively and axially with the sleeve 76. The yoke 66 has its end disposed in the collar 84, whereby, upon pivotal movement of the said yoke 66, the sleeve 76 will be operated axially.

In summation insofar as the control system is concerned, reciprocatory movement of the handle 62 imparts corresponding reciprocatory movement to the clutch operating sleeve 76 and the said sleeve 42, both of these sleeves moving in the same direction. However, the sleeve 42 is fixed with respect to rotative movement, while the sleeve 76 is capable of rotation.

Reference is first made to the holding assembly 30. A pressure plate 90 is provided with a facing 92 on one surface thereof. Shear pins 94 having heads 96 are passed through the pressure plate 90 and anchored to the end plate 22. Compression springs 98 are disposed in concentric relationship with the shear pins 94 and seat on the pressure plate 90 and the heads 96, constantly urging the pressure plate 90 toward the end plate 22. A brake disk 99 is disposed around the brake operator sleeve 76 and has projections 100, for example, disposed in the longitudinal external splines 104 which are formed on the outside surface of the brake operator sleeve 76. Hence, the disk 99 is slidable axially on the operator sleeve 76 but is prohibited from rotating thereon. Additional facing material 108 is disposed on the the inside surface of the end plate 22 for engagement with one face of the brake plate 99.

The pressure plate 90 is provided with a collar 110 concentrically located with respect to the center thereof and spaced from the outside surface of the clutch operating sleeve 76. A collar 112 having a flange 114 operatively connected with the collar 110, is fixed to the clutch operating sleeve 76. Upon movement of the clutch operating sleeve 76 inwardly with respect to the case 10, the flange 114 engages the collar 110 and pulls the pressure plate 90 away from the brake disk 99, against the opposing compressive force of the springs 98. If the sleeve 76 were held in this inward position, the holding assembly 30 would be disengaged or rendered ineffectual. In the condition as shown in Figure 3, the holding assembly 30 is engaged, drivingly connecting the clutch operating sleeve 76 with the outer case 10. The driven shaft 120 which is disposed in the bore of the clutch operating sleeve 76 and which is drivingly connected therewith through the medium of the splines (Figure 3) is operated in unison with the clutch operating sleeve 76 at all times. Accordingly, when the outer case 10 is coupled with the sleeve 76, the outer case rotates in unison with the driven shaft 120 which is splined to the sleeve 76.

Attention is now invited to the holding assembly generally indicated at 32. This holding assembly is also disposed within the extension 16. It consists of a pressure plate 122 having a collar 124 identical to the collar 110. The collar 126 is similar to the collar 112 and it has a flange 128 thereon operatively engageable with the said collar 124 in order to operate the pressure plate 122 axially on the clutch operating sleeve 76.

Shear pins 130 are fixed to the pressure plate 122 and pass through suitable openings in the backing member 134. The backing member includes a boss 136 which is fixed at substantially the center thereof. This boss is rigidly secured to the hollow shaft 138 which forms a part of an inner case of the fluid transmission (to be described in detail subsequently). The pin 140 is employed to insure the fixed connection between the backing member 134 and the hollow shaft 138.

The double face brake plate 144 which is identical to the double face brake plate 99 is provided with projections 146 which are disposed in the splines 104.

Accordingly, when the clutch operating sleeve 76 is operated in order to engage or disengage the holding assembly 30, the pressure plate 122 is also operated correspondingly. To move the clutch operating sleeve 76 outwardly, with respect to the showing of Figure 3, would cause the pressure plate 122 to move outwardly in view of the operative contacting engagement of the collar 124 and the flange 128. This would urge the pressure plate 122 against the opposing compression of the springs 149 reacting on the heads 150 of the shear pins 130.

Among the functions of the hollow shaft 138 is to act as a support for the driven shaft 120, which is partially disposed therein.

Reference is now made to the holding assembly 34 which is disposed within the extension 14, on the opposite side of the housing, generally indicated at 12. The backing plate 150 of assembly 34 is disposed on the hollow shaft 152, which hollow shaft is diametrically opposed from the shaft 138 and forms a part of the said inner case. A pin 154 is used for coupling the backing plate 150 to the hollow shaft 152. A double faced brake plate 156 is juxtaposed with respect to the backing plate 150 and has tongues 158 slidably disposed in the splines 162 which are formed on the exterior surface of the said sleeve 42. This allows the brake plate 156 to slide axially on the said sleeve 42 but prevents relative rotation of the brake plate 156 and the sleeve 42. Since the sleeve 42 cannot rotate, due to its connection with the lever 46, the brake plate 156 can never rotate.

The pressure plate 160 is connected with the backing plate 150 by means of the shear pins 163 having heads 164 thereon. Compression springs 166 which react on the heads 164 and the backing plate 150 oppose the operation of the pressure plate 160. In order to cause this operation, the collars 168 and 170 which are fixed on the sleeve 42 and with the pressure plate 160, respectively, are engaged when the sleeve 42 is reciprocatively operated. Suitable bearings 172 space the respective flanges of the collars from each other to decrease the friction between the flanges.

Since the sleeve 42 is reciprocated to effect engagement and allow disengagement by the springs 166 of the holding assembly 34, the said sleeve 42 will be referred to as the second clutch operating sleeve, while the sleeve 76 will be referred to as the first holding assembly operating sleeve.

The said holding assembly 36 consists of a pressure plate 180 having a collar 182 integral therewith, the collar including a flange (unnumbered) spaced from a flange 184 which is fixed to the collar 186. The said collar 186 is similar in structure and function to the collar 168 and there are anti-friction bearings 188 interposed between the respective flanges in this assembly.

Shear pins 190 are fixed to the end plate 20 of the extension 14 and have heads 192 thereon. These heads serve as a seat for the compression springs 194 which also seat on the pressure plate 180.

The end plate 20 is provided with facing material 198 which is adapted to be engaged by the disk 200 when the disk is pressed thereagainst by the action of the pressure plate 180. The said plate 200 is held in place on the second holding assembly operating sleeve 42 by means of tongues 201 which are disposed in the splines 162.

The holding assemblies are used for the purpose of obtaining the desired operation of the driven shaft 120 with respect to the operation of the drive shaft 38. The positions of the holding assemblies in obtaining these results are indicated in the table below:

|  | Disengaged | Engaged |
|---|---|---|
| Low Speed | 30:34 | 32:36 |
| Direct Drive | 34:36 | 30:32 |
| Reverse | 32:36 | 30:34 |

It will be noted that when the direct drive between the drive shaft 38 and the driven shaft 120 is effected, the holding assemblies 34 and 36 are disengaged, while the holding assemblies 30 and 32 are engaged. This is the condition of the structure shown in Figure 3.

Figure 4:
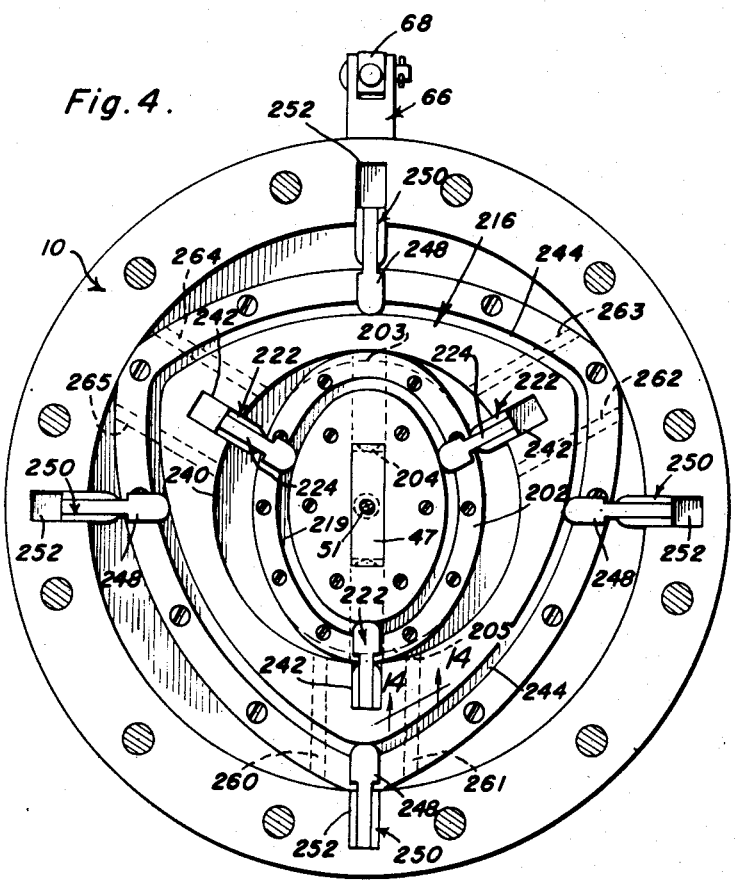
Figure 4 is a transverse sectional view taken on the line 4—4 of Figure 3 and in the direction of the arrows, illustrating, particularly, the structure of the pump reaction member and the rotor of the positive displacement pump.
Figure 8:
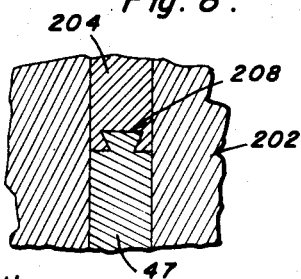
Figure 8 is a sectional view taken on line 8—8 of Figure 3, showing the dovetail connection between parts of the rotor which are adapted to move with respect to each other.

In order to arrive at the operational conditions previously described, a fluid pump capable of variable ratio output is employed and is preferably substantially identical to that structure disclosed in my previously referred to patent. However, in the instant case I have gone several steps further. The pump rotor 202 is generally elliptical (Figure 4) and is provided with sliding vanes 204 operable in suitable slots in said rotor. The rotor 202 has opposed passages 203 and 205 in the periphery thereof through which the sliding vanes 204 operate. When the vanes 204 are extended, they close the passages 203 and 205 whereby operation of the rotor results in the vanes 204 pushing fluid with them. When the vanes 204 are retracted, operation of the rotor is not reflected in the vanes pushing the fluid; hence, a "neutral" drive condition exists. An independent neutral and drive condition is caused through this structure by operation of the control member 50. The wedge block 47 is connected with the sliding vanes 204 by a dovetail and slot connection (Figure 8) 208 whereby movement of the wedge block in a direction parallel to the axis of the drive and driven shafts is imparted to the sliding vanes 204 but in a radial manner. The pilot shaft 210 which is fixed to the wedge block 47 is operable in a suitable bore 212 formed in the insert 214 which is secured to the inner case or pump reaction member generally indicated at 216.

A cam slot or track 219 is formed in one face of the substantially elliptical rotor and a similar cam slot or track 220 is formed on the opposite face thereof. Vanes, generally indicated at 222, are provided with parallel arms 224 and 226, respectively, and have fingers 230 and 228 extending therefrom (see Figure 12). These fingers are disposed in the cam tracks 219 and 220 so as to cause reciprocatory movement of the vanes 222 when the rotor 202 is operated. The said inner case 216 has three smoothly curved sides on the exterior thereof and a substantially circular fluid chamber 240 at the center thereof, wherein the substantially elliptical rotor 202 is located. Slots 242 are formed in the inner case 216 and have the vanes 222 slidably disposed therein, the sliding movement being responsive to the operation of the rotor 202.

Cam tracks 244 and 246, respectively, are formed on opposite faces of the said inner case 216, accommodating the fingers 248 of the sliding vanes (Figure 4) 250.

Accordingly, when the inner case 216 rotates, it acts in the nature of a rotor, the sliding vanes 250 being reciprocated in the slots 252 by the action of the fingers 248 in the cam tracks 244 and 246, respectively (Figure 3). As disclosed in Figure 4, the inner case and the rotor 202 may be made of several pieces bolted together so as to avoid expensive machining.

Figure 7:
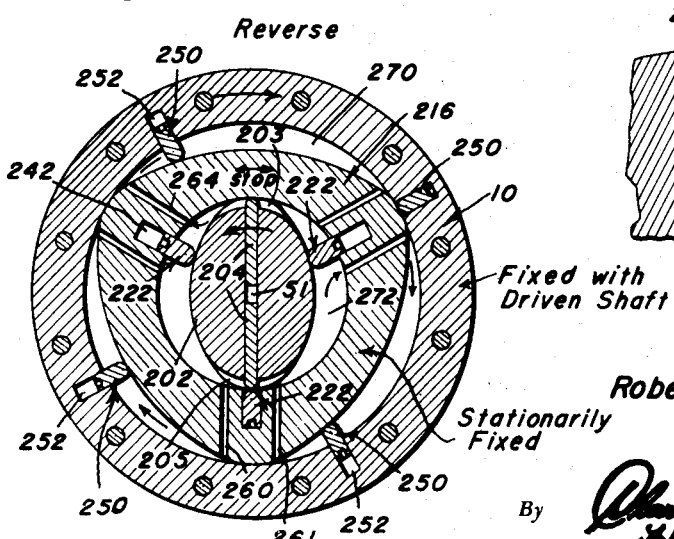
Figure 7 is a sectional view similar in structure to that of Figure 5 but illustrating the condition of the elements existing when the driven shaft operates in a direction reverse from the operation of the drive shaft.

The inner case 216 has been provided with six fluid conducting channels, one of which is detailed in Figure 14. The channels are in pairs. There is a first pair of channels consisting of channels or passages 260 and 261, a second pair consisting of passages 262 and 263, and a third pair consisting of passages 264 and 265, respectively. These pairs of channels or passages are used in conducting fluid to and from the motor chamber 270 and the pump chamber 272 (Figures 5, 6 and 7). This is necessary in the operation of the fluid pump portion of the device Referring now to Figure 3, the actuation of the rotor 202 is caused directly by rotation of the drive shaft 38. When the inner case 216 acts in the nature of a rotor, it is operated either by fluid pressure within the fluid pump or through the mechanical expedient of engagement of certain of the holding assemblies. Accordingly, the hollow shafts 138 and 152, respectively, which are mounted for rotation in the bearings, generally indicated at 278 and 280, respectively, must have the seals 282 and 284 to prevent leakage of the fluid into the extensions 14 and 16 respectively.

For the operation of the invention, specific attention is invited to Figures 3, 5, 6 and 7, respectively. To cause a direct drive between the drive shaft 38 and the driven shaft 120, the holding assemblies 34 and 36 are disengaged and the holding assemblies 30 and 32, respectively, are engaged by a single movement of the lever 62. In Figure 3, it is noted that the drive is through the shaft 38, the rotor 202, the inner case 216, the outer case 10, through both holding assemblies 30 and 32 which are engaged, and ultimately through the first holding assembly operating sleeve 76 to the driven shaft 120. The outer case 10 and the inner case 216 are fixed for unitary movement, that is, there is no relative movement therebetween. The holding assembly 30 fixed the outer case 10 to the shaft 120, while the holding assembly 32 fixes the inner case 216 to the shaft 120. There is substantially no slippage between the rotor 202 and the inner case 216, since the flow pattern of oil is as follows:

Assuming a counter-clockwise rotation of the rotor 202 (see Figure 5), oil in the chamber 272 is urged (for example) through the passages 262 and 264 in the direction of the arrows and through the passage 260, but, this oil strikes the abutment formed by one of the sliding vanes 250 which is disposed in the chamber 270. Hence, this oil cannot flow, and therefore torque applied to the rotor 202 is transferred substantially undiminished to the cases 10 and 216 which are fixed together by the said holding assemblies.

With respect to low speed and high torque operation, it is necessary only to move the lever 62 in one direceion so as to cause simultaneous operation of the first holding assembly operating sleeve 76 and the second holding assembly operating sleeve 42, whereby the assemblies 36 and 32 are engaged and the assemblies 34 and 30 are disengaged. The engagement of the assembly 32 causes the inner case 216 to be fixed with the shaft 120. The engagement of the assembly 36 causes the outer case 10 to be fixed so that it cannot rotate. This is done through the expedient of fixing the outer case 10 to the second holding assembly operating sleeve 42, anchored as described previously. Accordingly, the power transmission is occasioned through the drive shaft 38, the rotor 202 and the inner case 216 which is fixed to the driven shaft 120. In Figure 6, it is apparent that the oil or other fluid medium is urged from the chamber 272 through the passage (for example) 264, whereby it strikes the appropriate vane 250 which serves as an abutment. Since the outer case 10 is stationary, the reaction is on the inner case 216 which, in this instance, acts as a rotor. The volumetric capacity of the chamber 272 being greater than the capacity of the chamber 270, several rotations of the rotor 202 of the pump mechanism are required to cause a single revolution of the inner case 216. This causes a high torque and low speed condition to exist. Under this condition of operation, additional ratio changes may be effected by operation of the wedge block 47, as previously discussed.

One of the features of the present invention is the drive effected when it is desired to operate the driven shaft 120 in the reverse direction from the operation of the drive shaft 38. As disclosed in Figure 7, the inner case 216 is fixed with the non-rotatable second holding assembly operating sleeve 42. This is occasioned by engagement of the assembly 34. The outer case 10 is fixed with the driven shaft by engagement of the assembly 30. The other two holding assemblies are disengaged at this time. Simple manipulation of the handle 62 causes this condition to exist.

As the rotor 202 is operated in a counter-clockwise direction, the oil is forced through the passage 264 (for example) whereby it leaves the chamber 272 and impinges on one of the vanes 250 which act as an abutment. The inner case 216 being fixed, this causes the outer case 10 to be rotated. Of course, in the operation of the fluid pump, all of the passages are utilized, an explanation being given with respect to only one passage for each stage of operation, the functional utility of the remainder of the passages being obvious.

In summation, it will be seen that the transmission is capable of a forward speed that is the same as the input speed and a forward low speed of high torque. It is also capable of reverse ultimate speed of the driven shaft of high torque. However, during any operational condition, the relationship of torque to speed may be varied by reciprocation of the rod 51 which urges the vanes 204 radially within the chamber 272. All of the vanes with the exception of those indicated at 204 are spring-loaded by means of the springs 300 which react on the respective vanes and the inner case and pump rotor, respectively.

Having described the invention, what is claimed as new is:

1. In a fluid pump and motor transmission, an outer case having a motor chamber therein, a variable ratio fluid pump disposed in said motor chamber and including a pump reaction member and a pump rotor, said reaction member having a pump chamber therein in which said pump rotor is disposed and passages connecting the pump chamber to the motor chamber, a drive shaft fixed to said pump rotor, a driven shaft carried by the outer case, a first holding assembly operatively connected for coupling said outer case with said driven shaft, a second holding assembly operatively connecting said reaction member with said driven shaft, and means secured to said holding assemblies for operating the same.

2. In a fluid pump and motor transmission, an outer case having a motor chamber therein, a variable ratio fluid pump disposed in said motor chamber and including a pump reaction member and a pump rotor, said reaction member having a pump chamber therein in which said pump rotor is disposed and passages connecting the pump chamber to the motor chamber, a drive shaft fixed to said pump rotor, a driven shaft carried by the outer case, a first holding assembly operatively connected for coupling said outer case with said driven shaft, a second holding assembly operatively connecting said reaction member with said driven shaft, and means secured to said holding assemblies for operating the same in unison so that both of said holding assemblies are selectively engaged or disengaged simultaneously.

3. In a fluid pump and motor transmission, an outer case having a motor chamber therein, a variable ratio fluid pump disposed in said motor chamber and including a pump reaction member and a pump rotor, said reaction member having a pump chamber therein in which said pump rotor is disposed and passages connecting the pump chamber to the motor chamber, a drive shaft fixed to said pump rotor, a driven shaft carried by the outer case, a first holding assembly operatively connected for coupling said outer case with said driven shaft, a second holding assembly operatively connecting said reaction member with said driven shaft, and means secured to said holding assemblies for operating said assemblies, an operator carried by said case and fixed with respect to rotation, a third holding assembly secured to said reaction member and said operator to fix said reaction member with respect to rotation, and a fourth holding assembly secured to said operator and said case to fix said outer case with respect to rotative movement, said operator and said first and second holding assembly operating means being so arranged that only two of said assemblies are operative at one time.

4. In a fluid pump and motor transmission, an outer case having a motor chamber therein, a variable ratio fluid pump disposed in said motor chamber and including a pump reaction member and a pump rotor, said reaction member having a pump chamber therein in which said pump rotor is disposed and passages connecting the pump chamber to the motor chamber, a drive shaft fixed to said pump rotor, a driven shaft carried by the outer case, a first holding assembly operatively connected for coupling said outer case with said driven shaft, a second holding assembly operatively connecting said reaction member with said driven shaft, means secured to said holding assemblies for operating said holding assemblies in unison so that both of said holding assemblies are engaged or disengaged as a unit, and means operatively connected with and forming a part of said pump for preventing substantial relative movement of said outer case and pump with respect to said drive shaft.

5. A fluid pump and motor transmission comprising an outer case with means for rotatively mounting said outer case, said case having a motor chamber therein, a hollow reaction member rotatably mounted in said motor chamber, sliding vanes operably disposed in said motor chamber, a pump rotor in said hollow reaction member, a pump chamber in the reaction member in which the rotor is disposed, sliding vanes operably disposed in said pump chamber, passages in the reaction member connecting the chambers, a drive shaft secured to said rotor and extending outwardly from said case, a driven shaft, and means including a plurality of holding assemblies arranged for selectively coupling said case to said driven shaft, and said case together with said reaction member to said driven shaft.

6. A fluid pump and motor transmission comprising an outer case with means for rotatively mounting said outer case, said case having a motor chamber therein, a hollow reaction member rotatably mounted in said motor chamber, sliding vanes operably disposed in said motor chamber, a pump rotor in said hollow reaction member, a pump chamber in the reaction member in which the rotor is disposed, sliding vanes operably disposed in said pump chamber, passages in the reaction member connecting the chambers, a drive shaft secured to said rotor and extending outwardly from said case, a driven shaft, means selectively coupling said case to said driven shaft, and said case together with said reaction member to said driven shaft, said means including a pair of holding assemblies, an operator for said assemblies, means fixing said operator against rotation, and said assemblies being operatively connected with said reaction member and said outer case respectively to fix selectively said case to said operator and said reaction member to said operator.

7. A fluid pump and motor transmission comprising an outer case with means for rotatively mounting said outer case, said case having a motor chamber therein, a hollow reaction member rotatably mounted in said motor chamber, sliding vanes operably disposed in said motor chamber, a pump rotor in said hollow reaction member, a pump chamber in the reaction member in which the rotor is disposed, sliding vanes operably disposed in said pump chamber, passages in the reaction member connecting the chambers, a drive shaft secured to said rotor and extending outwardly from said case, a driven shaft, and means including a plurality of holding assemblies arranged for selectively coupling said case to said driven shaft, and said case together with said reaction member to said driven shaft, and manually operable means disposed in said rotor for controlling the effective seal between the high points of said rotor and the chamber wall of said pump.

8. In a transmission, an outer case having a motor chamber, a reaction member in the motor chamber and having a pump chamber and passages connecting the pump chamber to the motor chamber, sliding vanes operable in said motor chamber, a pump rotor disposed in the pump chamber, additional vanes operable between said rotor and said reaction member, a drive shaft secured to said rotor, a driven shaft carried by said case, and means including a plurality of holding assemblies for releasably stationarily fixing said reaction member and fixing said case with said driven shaft so that said rotor forces fluid from said pump chamber through said passages causing fluid to rotate said case in a direction opposite from the direction of rotation of said rotor.

9. In a transmission, an outer case having a motor chamber, a reaction member in the motor chamber and having a pump chamber and passages connecting the pump chamber to the motor chamber, sliding vanes operable in said motor chamber, a pump rotor disposed in the pump chamber, additional vanes operable between said rotor and said reaction member, a drive shaft secured to said rotor, a driven shaft carried by said case, and means including a plurality of holding assemblies for releasably stationarily fixing said case and fixing said reaction member with said driven shaft so that said rotor forces fluid through said passages from said pump chamber, thereby causing the fluid to rotate said reaction member in the same direction as said rotor but at a lower speed and higher torque.

10. In a transmission, an outer case having a motor chamber, a reaction member in the motor chamber and having a pump chamber and passages connecting the pump chamber to the motor chamber, sliding vanes operable in said motor chamber, a pump rotor disposed in the pump chamber, additional vanes operable between said rotor and said reaction member, a drive shaft secured to said rotor, a driven shaft carried by said case, and means including a plurality of holding assemblies for releasably stationarily fixing said case to said reaction member and fixing said case and said reaction member to said driven shaft so that rotation of said rotor urges the fluid through the passages until the fluid accumulates in front of the vanes in the motor chamber, the vanes in the motor chamber acting as abutments preventing further circulation of the fluid so that the speed and torque of the driven shaft is substantially the same as the speed and torque of the drive shaft.

11. The combination of claim 8 and radially disposed sliding vanes disposed in said pump chamber and carried by said rotor with means for actuating said radially disposed rotor carried vanes to control the effective seal between the high points of the rotor and the pump chamber walls.

12. The combination of claim 9 and radially disposed sliding vanes disposed in said pump chamber and carried by said rotor with means for actuating said radially disposed rotor carried vanes to control the effective seal between the high points of the rotor and the pump chamber walls.

13. The combination of claim 10 and radially disposed sliding vanes disposed in said pump chamber and carried by said rotor with means for actuating said radially disposed rotor carried vanes to control the effective seal between the high points of the rotor and the pump chamber walls.

ROBERT A. PYLE.

References Cited in the file of this patent

UNITED STATES PATENTS

| Number | Name | Date |
|---|---|---|
| 1,242,389 | Sweet | Oct. 9, 1917 |
| 1,497,741 | Schneider | June 17, 1924 |
| 1,774,048 | Wingquist | Aug. 26, 1930 |
| 1,797,439 | Napier | Mar. 24, 1931 |
| 1,870,824 | Shepard | Aug. 9, 1932 |
| 2,434,546 | Breedlove | Jan. 13, 1948 |
| 2,451,118 | Pyle | Oct. 12, 1948 |